United States Patent [19]
Naito et al.

[11] Patent Number: 5,010,490
[45] Date of Patent: Apr. 23, 1991

[54] CONSTANT SPEED CONTROL APPARATUS FOR MOTOR VEHICLE

[75] Inventors: Yasuo Naito; Hiroyuki Kouzuki, both of Himeji; Takeshi Murai, Hiroshima, all of Japan

[73] Assignees: Mitsubishi Electric Corporation, Tokyo; Mazda Motor Corporation, Hiroshima, both of Japan

[21] Appl. No.: 343,380

[22] Filed: Apr. 26, 1989

[30] Foreign Application Priority Data

Apr. 28, 1988 [JP] Japan ................. 63-106142

[51] Int. Cl.⁵ ........................ B60K 31/00; B60K 41/18
[52] U.S. Cl. ....................... 364/426.04; 364/431.07; 364/424.1; 364/424.04
[58] Field of Search ............ 364/426.04, 431.07, 364/424.1; 180/179, 178, 177, 175; 74/878, 868, 866

[56] References Cited

U.S. PATENT DOCUMENTS

| | | | |
|---|---|---|---|
| 4,414,863 | 11/1983 | Heino | 74/878 |
| 4,421,192 | 12/1983 | Ito et al. | 180/179 |
| 4,451,888 | 5/1984 | Kuno et al. | 364/426.04 |
| 4,697,478 | 10/1987 | Mastumoto et al. | 180/177 |
| 4,833,612 | 5/1989 | Okuno et al. | 364/426.04 |
| 4,845,621 | 7/1989 | Kawata et al. | 180/179 |

FOREIGN PATENT DOCUMENTS

| | | | |
|---|---|---|---|
| 57-196317 | 2/1982 | Japan. | |
| 0046349 | 3/1984 | Japan | 180/179 |

*Primary Examiner*—Allen R. MacDonald
*Assistant Examiner*—A. Sheikh

[57] ABSTRACT

A constant speed control apparatus for a motor vehicle includes a setting section for setting a target vehicle speed, a first detection section for detecting a vehicle speed of a traveling vehicle, a shift-down signal output section for, when the detected vehicle speed is decreased from the target vehicle speed to fall outside a predetermined range in a constant speed travel state, outputting a signal to cause an automatic transmission to perform a shift-down operation, a second detection section for detecting that the detected vehicle speed is essentially recovered to the target vehicle speed after the shift-down signal is output, an estimation section for estimating a road surface inclination on the basis of an engine load and the detected vehicle speed, and a shift-up signal output section for, when the detection result by the second detection section and an estimation result of essentially not an uphill by the estimation section are established, outputting a shift-up signal to the automatic transmission.

15 Claims, 8 Drawing Sheets

CONSTANT SPEED CONTROL APPARATUS FOR MOTOR VEHICLE

BACKGROUND OF THE INVENTION

The present invention relates to a constant speed control apparatus for a motor vehicle, which can automatically control a speed without requiring operation of an accelerator pedal and, more particularly, to a constant speed control apparatus for a motor vehicle, which causes an automatic transmission to shift down when a detected vehicle speed is decreased by a predetermined value or more from a target vehicle speed during vehicle travel.

As a conventional constant speed control apparatus for a motor vehicle which causes an automatic transmission to shift down when a detected vehicle speed is decreased by a predetermined value or more from a target vehicle speed during travel, a technique described in, e.g., Japanese Patent Laid-Open (Kokai) No. 57-19631 is known. In this conventional technique, a shift-up timing from the shift-down state is set at a time after the lapse of a predetermined time interval from when the detected vehicle speed is recovered to a target vehicle speed.

The conventional technique assures comfortable constant speed travel even on an uphill. However, if the timer sets a short predetermined time interval, shift-up and shift-down operations are repeated several times on a long uphill, thus impairing comfort. In the conventional technique, if the timer sets a long predetermined time interval, when a shift-down operation is performed on a short uphill, the shift-down state is maintained for a long period of time even if the road changes to a downhill, thus posing a problem in terms of an improvement of fuel consumption.

SUMMARY OF THE INVENTION

The present invention has been made in consideration of the above problems, and has as its object to provide a constant speed control apparatus for a motor vehicle which can improve fuel consumption without unnecessarily prolonging a shift-down state required for recovering a vehicle speed to a target vehicle speed, and without causing hunting of a shift change.

To solve the above problems and to attain the above object, a constant speed control apparatus for a motor vehicle according to a first aspect of the present invention, comprises: setting means for setting a target vehicle speed; first detection means for detecting a vehicle speed of a traveling vehicle; shift-down signal output means for, when the detected vehicle speed is decreased from the target vehicle speed to fall outside a predetermined range in a constant speed travel state, outputting a signal to cause an automatic transmission to perform a shift-down operation; second detection means for detecting that the detected vehicle speed is substantially recovered to the target vehicle speed after the shift-down signal is output; estimation means for estimating a road surface inclination on the basis of an engine load and the detected vehicle speed; and shift-up signal output means for, when the detection result by the second detection means and an estimation result of substantially not an uphill by the estimation means are established, outputting a shift-up signal to the automatic transmission.

In the constant speed control apparatus for a motor vehicle with the above arrangement, when the vehicle comes to an uphill and its vehicle speed is decreased, an automatic transmission is shifted down when a deviation from a target vehicle speed exceeds a predetermined value. When both conditions that a detected vehicle speed is recovered to the target vehicle speed and that a road surface inclination which is estimated on the basis of a load and a travel speed does not indicate an uphill are established, the automatic transmission is shifted up.

The estimation means is characterized by correcting a reference value used when the shift-up signal is output in accordance with a road surface inclination which is estimated when the shift-down signal is output. Therefore, according to the present invention, there can be provided a constant speed control apparatus for a motor vehicle, which can improve fuel consumption without unnecessarily prolonging a shift-down state required for recovering a vehicle speed to a target vehicle speed, and without causing hunting of a shift change. In addition, even when an estimated inclination $\delta_P$ of a road surface is shifted from an actual inclination of the road surface, the apparatus of the present invention can solve the problems that a shift-up operation is erroneously performed by erroneously estimating a downhill immediately after the shift-down operation is performed on an uphill or a shift-up operation is not performed even on a downhill since the estimated inclination $\delta_P$ indicates an uphill.

The estimation means is characterized by correcting an estimated road surface inclination in accordance with a lapse time from when the shift-down signal is output. Therefore, according to the present invention, there can be provided a constant speed control apparatus for a motor vehicle, which can improve fuel consumption without unnecessarily prolonging a shift-down state required for recovering a vehicle speed to a target vehicle speed, and without causing hunting of a shift change. In addition, even when an estimated inclination $\delta_P$ of a road surface is shifted from an actual inclination of the road surface, the apparatus of the present invention can solve the problems that a shift-up operation is erroneously performed by erroneously estimating a downhill immediately after the shift-down operation is performed on an uphill or a shift-up operation is not performed even on a downhill since the estimated inclination $\delta_P$ indicates an uphill.

The estimation means is characterized by correcting a reference value used when the shift-up signal is output in accordance with a lapse time from when the shift-down signal is output. Therefore, according to the present invention, there can be provided a constant speed control apparatus for a motor vehicle, which can improve fuel consumption without unnecessarily prolonging a shift-down state required for recovering a vehicle speed to a target vehicle speed, and without causing hunting of a shift change. In addition, even when an estimated inclination $\delta_P$ of a road surface is shifted from an actual inclination of the road surface, the apparatus of the present invention can solve the problems that even when an estimated inclination $\delta_P$ of a road surface is shifted from an actual inclination of the road surface, a shift-up operation is erroneously performed by erroneously estimating a downhill immediately after the shift-down operation is performed on an uphill or a shift-up operation is not performed even on a downhill since the estimated inclination $\delta_P$ indicates an uphill.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENT

An arrangement of an embodiment of a constant speed control apparatus for a motor vehicle according to the present invention will be described in detail below with reference to the accompanying drawings.

A constant speed control apparatus (to be referred to simply as an ASC hereinafter) 10 for a motor vehicle is equipped in a motor vehicle 12, and is an apparatus for automatically controlling a speed so that a driver (or operator) need not keep operating an accelerator pedal 14 when the vehicle 12 travels on a freeway at a constant speed for a long period of time. In this embodiment, the ASC 10 is used in combination with an automatic transmission 16.

Figure 1:
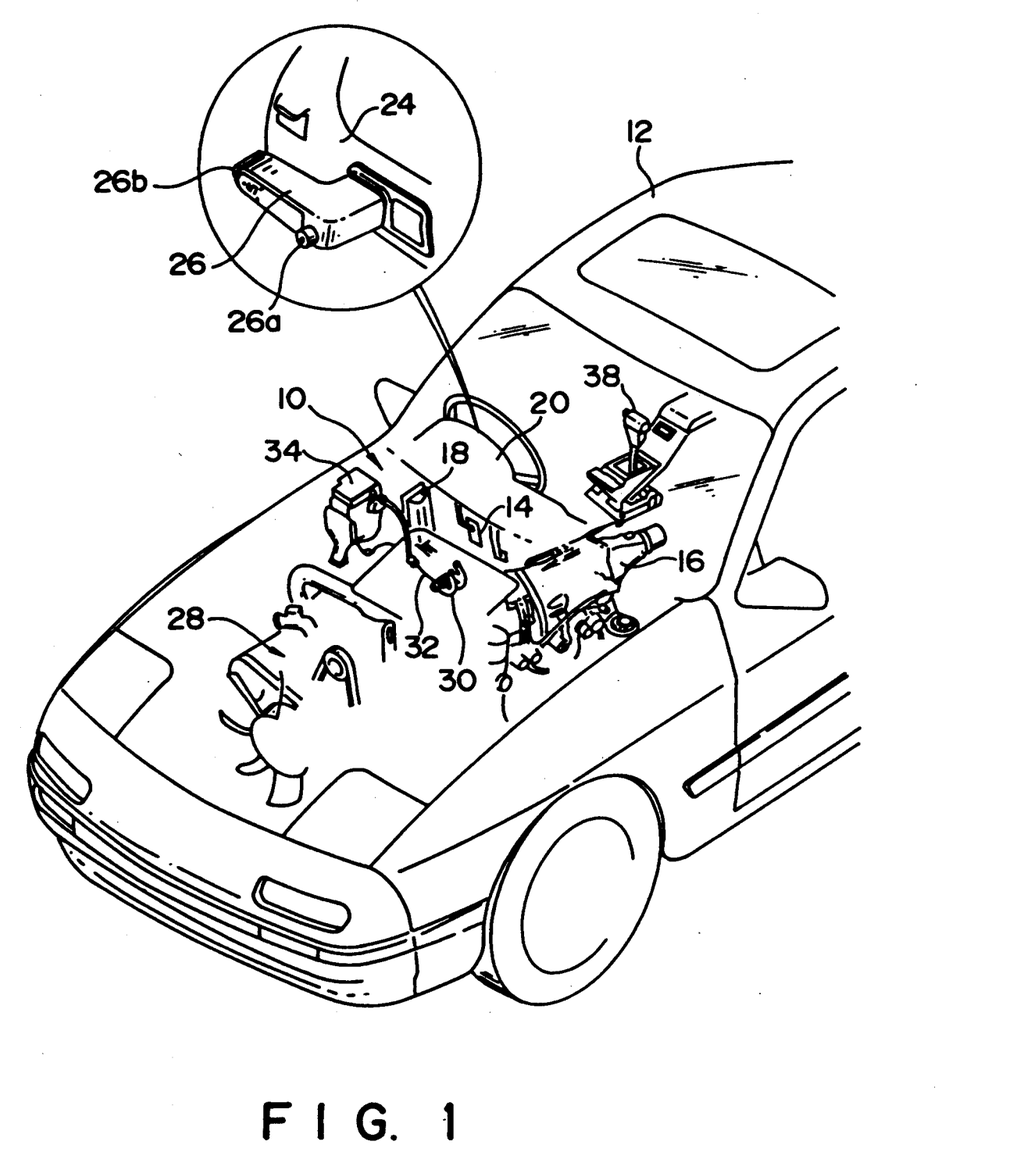
FIG. 1 is a schematic perspective view showing an arrangement of a motor vehicle to which an embodiment of a constant speed control apparatus for a motor vehicle according to the present invention is applied.

As shown in FIG. 1, the ASC 10 mainly comprises a control unit 18, disposed in an engine room of the vehicle 12, for performing automatic constant speed control, a vehicle speed sensor (FIG. 2A) 22, disposed in a speedometer 20, for detecting a present vehicle speed $D_D$, various operation switches 26 which are disposed on the front surface of an instrument panel 24 in a compartment and are operated by the driver to input instructions, and an actuator 34, connected to an accelerator wire 32 to drive a throttle valve 30 of an engine 28, for driving the throttle valve 30 on the basis of a control signal from the control unit 18 to achieve constant speed travel. The control unit 18 outputs a shift-down signal or a shift-up signal to the automatic transmission 16 in accordance with a control procedure (to be described later).

The basic operation of the ASC 10 will be described below. More specifically, in a normal travel state wherein the accelerator pedal 14 is operated, when a main switch 26a of the operation switches 26 is turned on, or a set switch 26b of the operation switches 26 is turned on at an arbitrary speed (which can be set within the range of 40 to 100 km/h), a set speed $D_S$ is stored in a vehicle speed storage/setting section in the ASC 10.

When the set switch 26b is turned on, an acceleration mode is simultaneously set. When the acceleration mode is set, an electromagnetic clutch (not shown) of the actuator 34 is turned on, and its internal motor is operated to pull the accelerator wire 32 connected to the throttle valve 30. In this manner, the throttle valve 30 is opened, and an engine speed is increased, thus accelerating the vehicle.

On the other hand, when a detected vehicle speed $D_D$ from the vehicle speed sensor 22 substantially coincides with the set vehicle speed $D_S$ described above, a hold mode is selected, and the operation of the motor is stopped, so that the throttle valve 30 is maintained at that opening. The accelerator wire 32 is held by only the operation of the electromagnetic clutch. In this manner, a constant speed state can be maintained.

In the ASC 10 described above, in order to correct a change in actual speed on the basis of a change in road condition, the vehicle speed $D_D$ detected by the vehicle speed sensor 22 is always compared with the stored set vehicle speed $D_S$. More specifically, if it is determined that the detected vehicle speed $D_D$ is lower than the stored set vehicle speed $D_S$, the acceleration mode is set, and the motor is operated to pull the accelerator wire 32, thereby increasing the opening of the throttle valve 30. On the other hand, if it is determined that the detected vehicle speed $D_D$ is higher than the stored set vehicle speed $D_S$, a deceleration mode is set, and the motor is rotated in a reverse direction to release the accelerator wire 32, thereby decreasing the opening of the throttle valve 30. Such operations are repeated to maintain a constant speed travel state at the set vehicle speed $D_S$.

Note that the operations for maintaining a constant speed travel state are executed while the transmission ratio of the automatic transmission 16 is fixed to a ratio (high-speed gear ratio) for an overdrive speed regardless of the position of a shift lever 38. In other words, in a normal constant speed travel mode, an inhibiter signal is output to the automatic transmission 16, so that the automatic transmission 16 is inhibited from performing an automatic transmission operation. However, when the detected vehicle speed $D_D$ is higher than the set vehicle speed $D_S$ by a predetermined deviation $\Delta D_1$, e.g., 8 km/h or more, this state cannot be coped with when the transmission ratio of the automatic transmission 16 is fixed to a ratio for the overdrive speed. Therefore, a shift-down signal is output to the automatic transmission 16 in accordance with a control procedure (to be described later), thereby executing an operation for switching the transmission ratio of the automatic transmission 16 to a lower-speed ratio by one speed.

Output control of the shift-up and shift-down signals to the automatic transmission 16 in the ASC 10 as the characteristic feature of the present invention will be described hereinafter with reference to FIG. 2 and subsequent drawings.

In the following description, a schematic block arrangement of the ASC 10 will be described with reference to FIGS. 2A, 2B and 3, and a control procedure will be described in detail with reference to FIGS. 4A to 6.

Figure 2A:
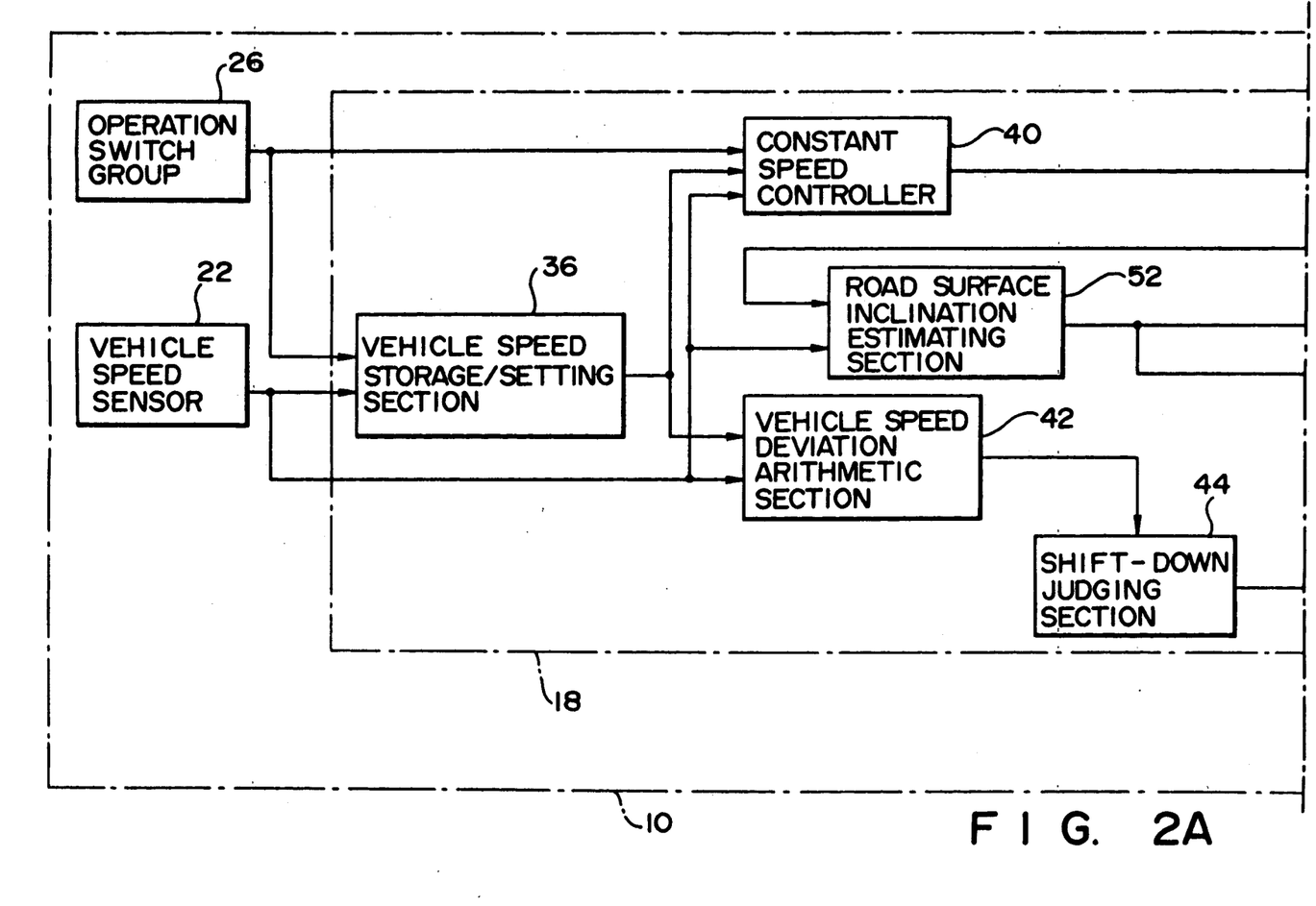
FIGS. 2A and 2B are a block diagram showing a functional block arrangement of the constant speed control apparatus for the motor vehicle.
Figure 2B:
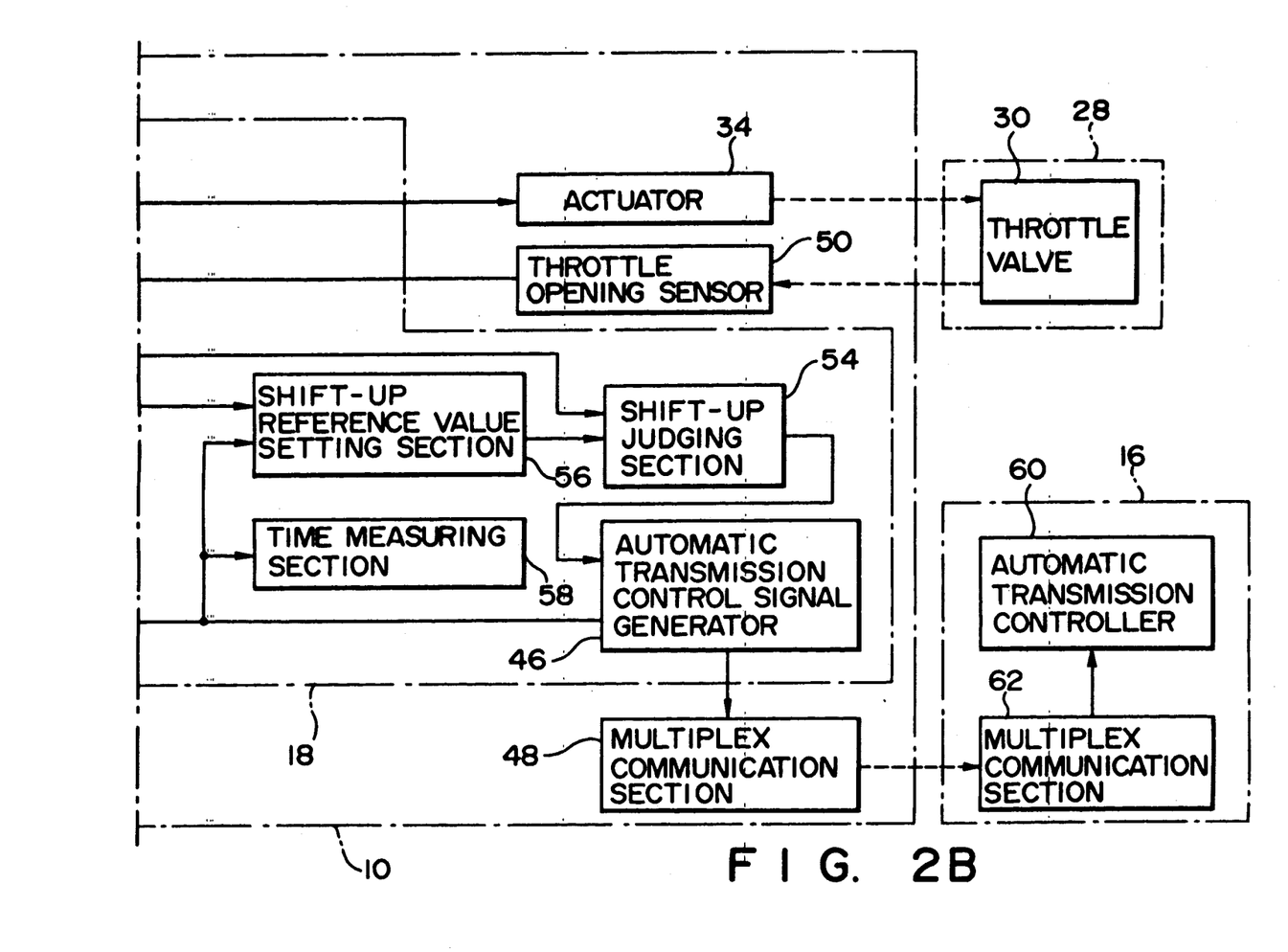

The control unit 18 of the ASC 10 comprises a constant speed controller 40 for executing constant speed control in practice in accordance with operations of the operation switches 26, as shown in the functional block in FIGS. 2A and 2B. The constant speed controller 40 drives the actuator 34 in accordance with the above-mentioned control content so that the detected vehicle speed (actual vehicle speed) $D_D$ coincides with the set vehicle speed $D_S$ set and stored in a vehicle speed storage/setting section 36.

The control unit 18 comprises a speed deviation arithmetic section 42 for calculating a first speed deviation $\Delta D_1$ between the set vehicle speed $D_S$ set at the vehicle speed storage/setting section 36 and the detected vehicle speed $D_D$ detected by the vehicle speed sensor 22. The speed deviation arithmetic section 42 is connected to a shift-down judging section 44 for judging a shift-down operation, and always outputs the arithmetic result thereto. When the input arithmetic result, i.e., the calculated first speed deviation $\Delta D_1$ is equal to or higher than a predetermined value, e.g., 8 km/h, the shift-down judging section 44 outputs a shift-down signal.

The shift-down judging section 44 is connected to an automatic transmission control signal generator 46, and outputs the shift-down signal thereto. When the automatic transmission control signal generator 46 receives the shift-down signal, it outputs, to a multiplex communication section 48 for the ASC, a shift-down control signal for causing the automatic transmission 16 to perform a shift-down operation. Upon reception of the shift-down control signal, the multiplex communication section 48 adds an identification signal indicating that a signal is supplied from the ASC 10 to a communication signal, and outputs a time-shared shift-down signal onto a signal line (not shown).

The control unit 18 comprises the following functional blocks for causing the automatic transmission 16 to perform a shift-up operation to recover a normal constant speed mode when predetermined conditions are satisfied, more specifically, when it is determined that a road surface inclination of a road does not indicate an uphill in a state wherein the detected vehicle speed $D_D$ is converged to the set vehicle speed $D_S$ within a predetermined range after the shift-down signal is output.

The ASC 10 estimates a road surface inclination $\delta_P$ during travel on the basis of the correlation between an engine load and the detected vehicle speed $D_D$, judges based on the estimation result and a reference value $\delta_R$ that the road surface is not an uphill, i.e., is flat or a downhill, and then outputs a shift-up signal. As a means for detecting the engine load, the ASC 10 comprises a throttle opening sensor 50 for detecting a throttle opening TVO of the throttle valve 30.

The control unit 18 comprises a road surface inclination estimating section 52 for estimating a road surface inclination $\delta_P$ on the basis of the throttle opening TVO from the throttle opening sensor 50 and the detected vehicle speed $D_D$ from the vehicle speed sensor 22. The road surface inclination estimating section 52 is connected to a shift-up judging section 54 and a shift-up reference value setting section 56, and outputs the estimated road surface inclination $\delta_P$ thereto.

The reference value $\delta_R$ set by the shift-up reference value setting section 56 is used as a reference to judge that the estimated road surface inclination $\delta_P$ is returned to a flat state, and is subjected to two types of correction to be described below. More specifically, the shift-up reference value setting section 56 receives the signals from the shift-down judging section 44 and a time measuring section 58 (to be described later). The shift-down judging section 44 receives the shift-down signal. The gradient of the reference value $\delta_R$ is determined on the basis of the value of the road surface inclination $\delta_P$ estimated by the road surface inclination estimating section 52 when the shift-down signal is input.

The time measuring section 58 receives the shift-down signal from the shift-down judging section 44. The time measuring section 58 measures a lapse time T from when the shift-down signal is input. The shift-up reference value setting section 56 is corrected on the basis of the lapse time T. The reference value $\delta_R$ data from the shift-up reference value setting section 56 with the above arrangement is always output to the shift-up judging section 54.

The shift-up judging section 54 outputs the shift-up signal to the automatic transmission control signal generator 46 described above after the lapse of a predetermined time interval t, e.g., 2.5 sec from when the estimated road surface inclination $\delta_P$ from the road surface inclination estimating section 52 coincides with the reference value $\delta_R$ set by the shift-up reference value setting section 56, in other words, from when it is determined that the estimated road surface inclination indicates a flat surface.

The automatic transmission control signal generator 46 outputs a shift-up control signal for causing the automatic transmission 16 to perform a shift-up operation to the multiplex communication section 48 for the ASC in the same manner as in the case wherein the shift-down signal is input. Upon reception of the shift-up signal, the multiplex communication section 48 adds an identification signal indicating that a signal is supplied from the ASC 10 to a communication signal, and outputs a time-shared shift-up signal onto a signal line (not shown).

The automatic transmission 16 described above has a multiplex communication section 62 for an automatic transmission controller 60 for automatically controlling the transmission. The multiplex communication section 62 communicates shift-up and shift-down control signals with the multiplex communication section 48 for the ASC 10 by multiplex communication.

Figure 3:
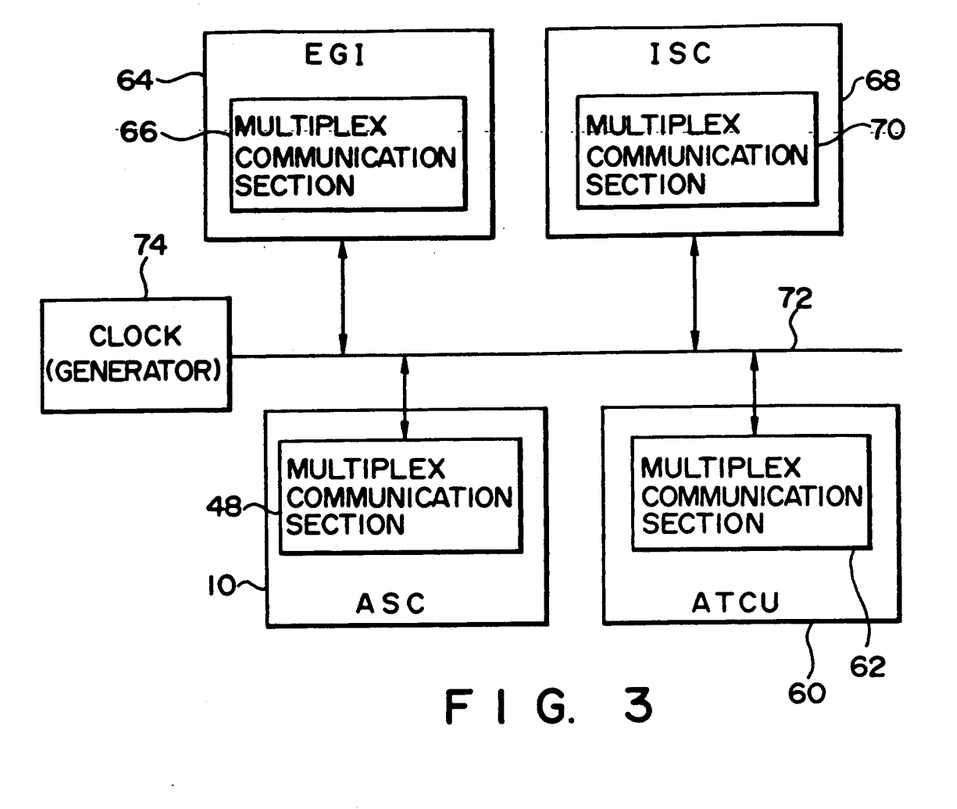
FIG. 3 is a block diagram showing an arrangement of a multiplex communication system.

More specifically, as shown in FIG. 3, the multiplex communication system executes multiplex communication in a so-called time-sharing manner, and comprises a multiplex communication section 66 of a controller (to be abbreviated to as an EGI hereinafter) 64 for executing fuel injection control, a multiplex communication section 70 of a controller (to be abbreviated to as an ISC hereinafter) 68 for executing idling rotational speed control, the multiplex communication section 62 for the controller 60 for executing electronic control of the automatic transmission 16, the multiplex communication section 48 of the control unit 18 for the ASC 10 as the characteristic feature of the present invention, a common bus line 72, and a clock generator 74 for performing synchronization of transmission/reception among the communication sections to achieve time-sharing processing.

The control procedure of output control of the shift-up/shift-down signal in the ASC 10 will be described in detail below with reference to FIGS. 4A to 6. Note that this control procedure is defined as an interruption routine executed every 30 msec in a main constant speed control procedure (not shown).

Figure 4A:
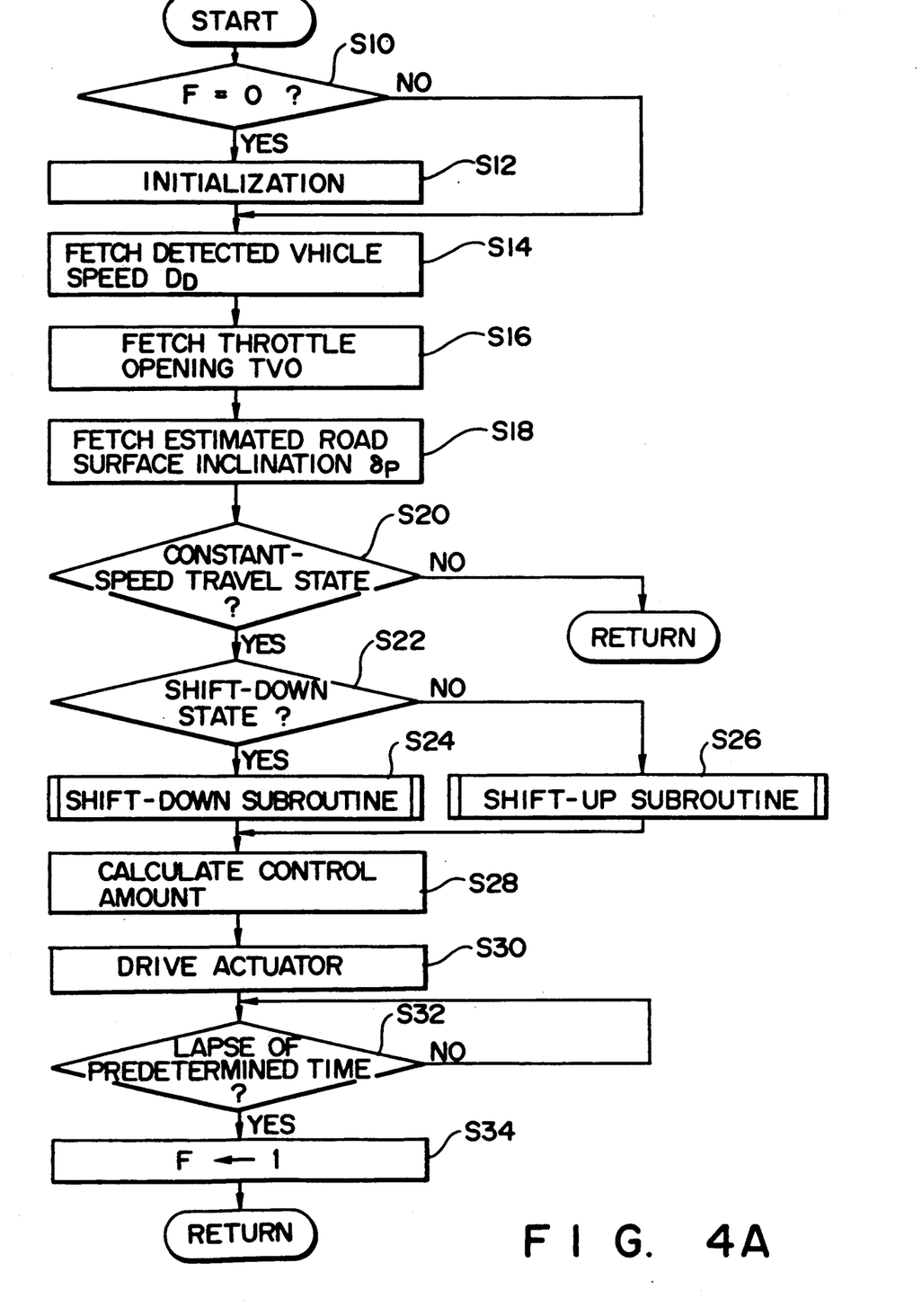
FIG. 4A is a flow chart showing an output control procedure of a shift-up/shift-down signal.

As shown in FIG. 4A, at an interruption timing, it is checked in step S10 if a flag F is reset. Since the flag F is reset in an initial state, YES is determined in step S10 at the beginning of the control operation. In step S12, various values are initialized, and step S14 is then executed. Note that the flag F is set immediately before this control procedure returns, as will be described later. As a result, in the second cycle and thereafter of this control procedure, NO is obtained in step S10, i.e., it is determined that the flag F is set. As a result, initialization in step S12 is not executed, and the flow jumps to step S14.

In step S14, the present detected vehicle speed $D_D$ is fetched on the basis of the detection result from the vehicle speed sensor 22. In step S16, the present throttle opening TVO is fetched on the basis of the detection result from the throttle opening sensor 50. In step S18, the estimated inclination $\delta_P$ of the road surface on which the vehicle is traveling is fetched from the present vehicle speed (detected vehicle speed) $D_D$ and the throttle opening TVO fetched in steps S14 and S16 on the basis of the correlation shown in FIG. 5.

It is then checked in step S20 if the present travel state is in a constant speed mode. If NO in step S20, i.e., if it is determined an acceleration or deceleration mode is selected although the control state using the ASC 10 is set, the following control is not required, i.e., the shift-up/shift-down signal need not be output. Thus, the control procedure returns, and the flow returns to a main routine (not shown).

If YES in step S20, i.e., if it is determined that the constant speed mode is selected, it is then checked in step S22 if the present drive state corresponds to a state wherein the gear ratio is shifted down toward a lower-speed side. If NO in step S22, that is, if it is determined that the present drive state is not a shift-down state but is an overdrive state, a shift-down subroutine is executed in step S24. The shift-down subroutine will be described later with reference to FIG. 4B.

If YES in step S22, i.e., if it is determined that the present drive state is the shift-down state, a shift-up subroutine is executed in step S26. The shift-up subroutine will be described later with reference to FIG. 4C.

After step S24 or S26 is executed, an arithmetic operation of a control amount for driving the actuator 34 for converging the present vehicle speed, i.e., the detected vehicle speed $D_D$ to the set vehicle speed $D_S$ is executed in step S28. In step S30, the actuator 34 is driven on the basis of the calculated control amount, and upon driving of the actuator 34, the throttle valve 30 is pivotally driven.

Thereafter, it is checked in step S32 if a lapse time from when the actuator 34 is driven has reached a predetermined time interval. The predetermined time interval is set to be a value long enough for the actuator 34 to complete its operation. If NO in step S32, that is, if it is determined that the predetermined time interval has not elapsed, the next step is not executed, and the lapse of the predetermined time interval is waited. In other words, the control procedure is inhibited from returning for a predetermined time interval in step S32, thereby assuring an operation time of the actuator 34.

If YES in step S32, i.e., if the predetermined time interval has passed, the flag F is set to be "1" in step S34, thus completing a series of control procedures for outputting the shift-up or shift-down signal. The flow then returns to the main routine (not shown).

The shift-down subroutine in step S24 will be described in detail below with reference to FIG. 4B.

Figure 4B:
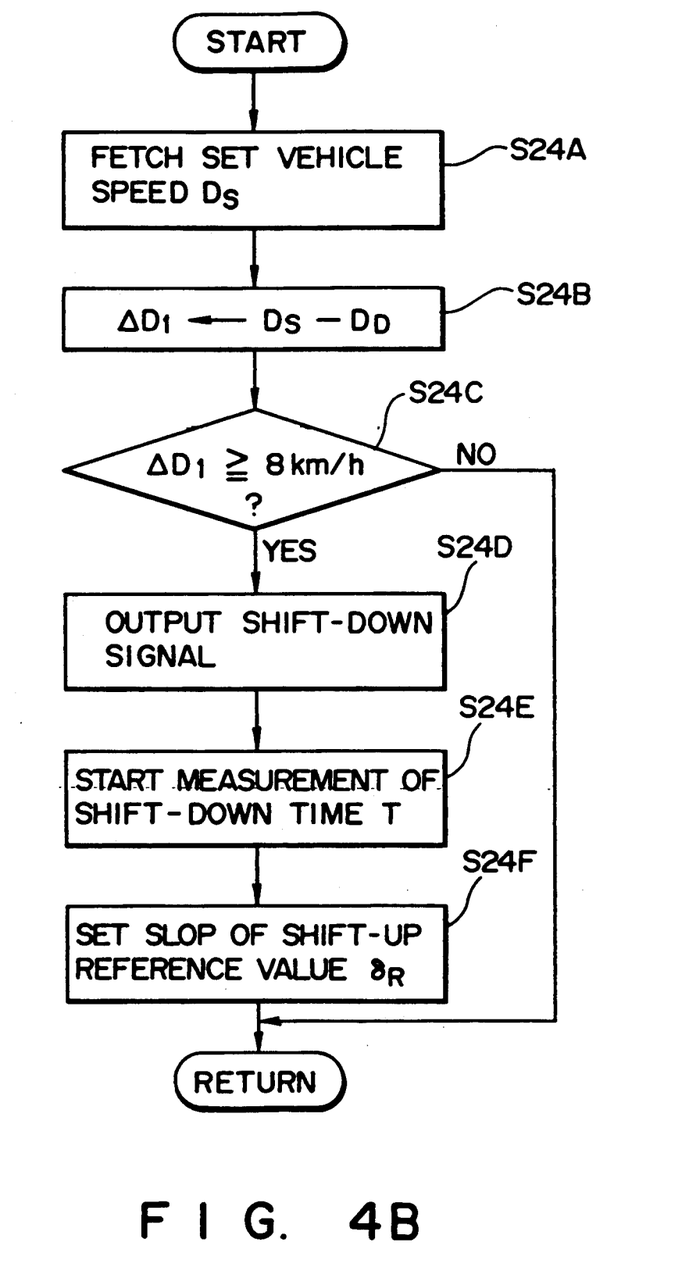
FIG. 4B is a flow chart showing a shift-down subroutine.

In this shift-down subroutine, as shown in FIG. 4B, the set vehicle speed $D_S$ is fetched in step S24A. In step S24B, a deviation between the set vehicle speed $D_S$ and the detected vehicle speed (present vehicle speed) $D_D$ is calculated, and is defined as the first speed deviation $\Delta D_1$. Thereafter, it is checked in step S24C if the first speed deviation $\Delta D_1$ is equal to or larger than 8 km/h as a predetermined allowance. If NO in step S24C, i.e., if it is determined that the first speed deviation $\Delta D_1$ is smaller than 8 km/h, the shift-down operation need not be performed in the present travel state, and the constant speed control can be executed by only the drive control of the throttle valve 30. Therefore, the shift-down signal is not output, and this subroutine returns.

Figure 6:
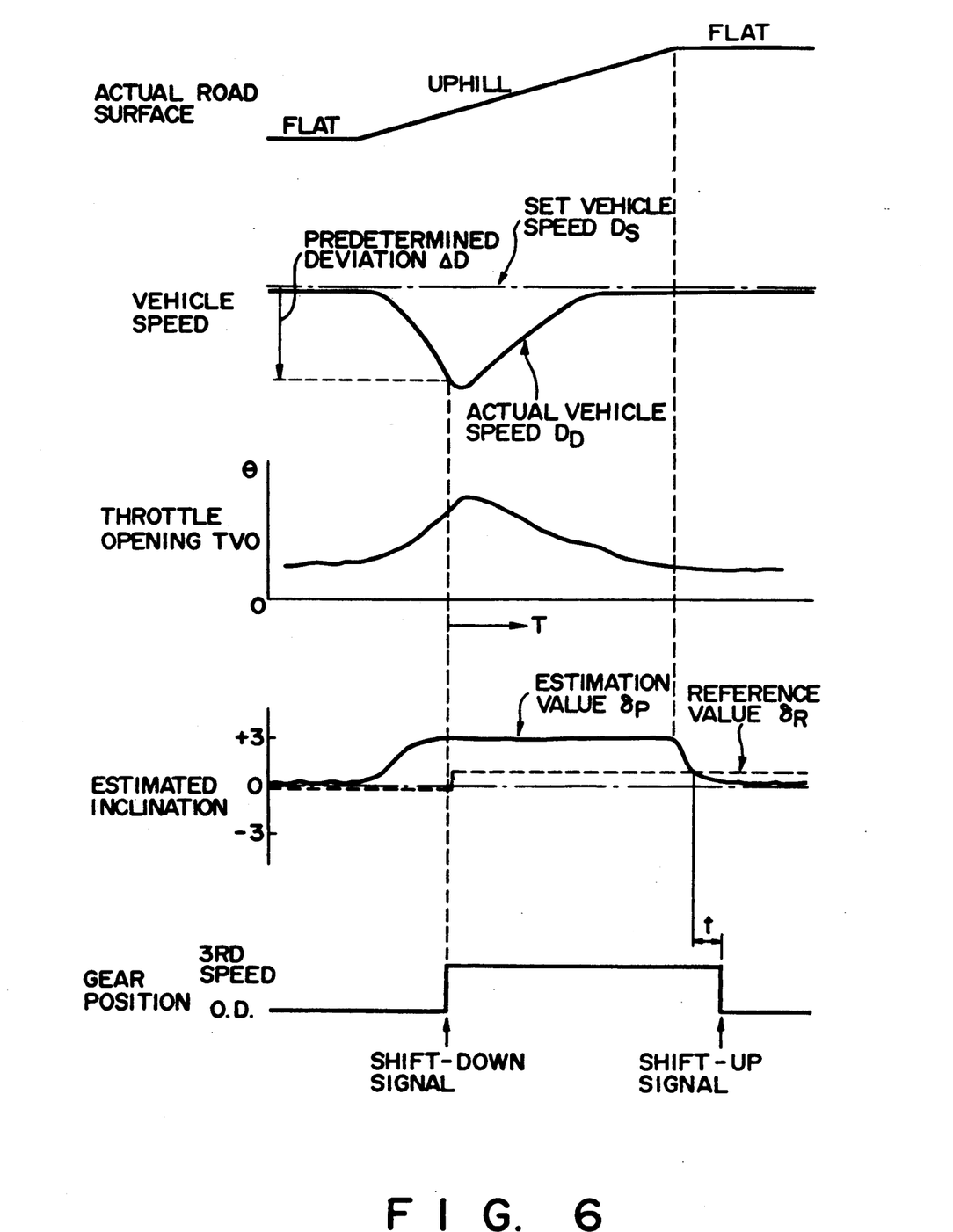
FIG. 6 is a timing chart showing an inclined state of an actual road surface, the relationship between a detected vehicle speed and a target vehicle speed, a change in throttle opening, the relationship between an estimated inclination of a road surface and a shift-up reference value, and a change in gear position in an automatic transmission.

If YES in step S24C, i.e., if it is determined that the first speed deviation $\Delta D_1$ is equal to or larger than 8 km/h and it is impossible to converge the present vehicle speed to the set vehicle speed $D_S$ unless the shift-down operation is performed, the shift-down signal is output from the shift-down judging section 44 in step S24D. As shown in FIG. 6, in the automatic transmission 16, the gear ratio is shifted down to a third-speed gear ratio lower by one speed regardless of the selected position of the shift lever 38.

Thereafter, in step S24E, the shift-down time T as a lapse time from outputting of the shift-down signal begins to be measured. In step S24F, a gradient of the shift-up reference value $\delta_R$, serving as a reference used when the shift-up signal is output, upon the lapse of the shift-down time T is set.

The gradient of the shift-up reference value $\delta_R$ is set in accordance with the estimated inclination $\delta_P$ when the shift-down signal is output, and is defined as shown in the Table below.

TABLE

| Estimated Inclination $\delta_P$ (%) | Shift-Up Time T | | |
|---|---|---|---|
| | Until 10 sec | 10–20 sec | After 20 sec |
| $\tan\delta_P > 3$ | 0.25 | 0.75 | 0.75 |
| $0 < \tan\delta_P \leq 3$ | −0.75 | 0.25 | 0.75 |
| $\tan\delta_P \leq 0$ | When $\tan\delta_P > -4$: $\tan\delta_P - 1$ When $\tan\delta_P \leq -4$: −4 | When $\tan\delta_P > -2$: $\tan\delta_P - 0.25$ When $\tan\delta_P \leq -2$: −2 | 0.75 |

In this table, the estimated inclination $\delta_P$ is defined in accordance with a value which changes according to the lapse of the shift-down time T.

As is apparent from this table, a gradient of a change in estimated inclination is set to be smaller as the inclination $\delta_P$ estimated when the shift-down signal is output becomes larger. More specifically, when the tangent of the inclination $\delta_P$ estimated when the shift-down signal is larger than 3%, the tangent of the shift-up reference value $\delta_R$ is set to be 0.25% until 10 seconds as the shift-down time T have passed. After the lapse of 10 seconds, the tangent of the value $\delta_R$ is increased to 0.75%, and is maintained. In this manner, along with the elapse of the shift-down time T, the shift-up reference value $\delta_R$ is corrected to output the shift-up signal at an earlier timing.

When the tangent of the inclination $\delta_P$ estimated when the shift-down signal is larger than 0% and is equal to or smaller than 3%, the tangent of the shift-up reference value $\delta_R$ is set to be $-0.75\%$ until 10 seconds have passed. Until the lapse of 20 seconds after 10 seconds, the tangent of the value $\delta_R$ is increased to 0.25%. After the lapse of 20 seconds, the tangent is set to be 0.75%, and is maintained.

In this manner, when a shift-down operation is performed on an uphill with a slow slope or an almost flat road surface, a case wherein there are many passengers and an engine load is large or the resistance of an against wind is large can be considered. Therefore, it can be determined that the shift-down operation is performed not due to a steep inclination of the uphill. The initial value of the shift-up reference value $\delta_R$ is decreased as compared to a case wherein the tangent of the estimated inclination is larger than 3% to make the shift-up signal difficult to be output as much as possible. A large gradient of a change is set. Therefore, when the shift-down state is continued for a long period of time, a shift-up signal is easily output at an earlier timing.

When the tangent of the inclination $\delta_P$ estimated when the shift-down signal is output is equal to or smaller than 0%, i.e., it is determined that it indicates a downhill, an abnormal state is determined. In this case, the initial value of the tangent of the reference value is set to be an extremely small value so as to make a shift-up signal difficult to be output as much as possible until 20 seconds as the shift-down time T have passed. However, after the lapse of 20 seconds as the shift-down time T, the shift-up operation must be performed as early as possible. The tangent of the shift-up reference value $\delta_R$ is set and held to be 0.75%.

As a result, even when the estimated inclination $\delta_P$ of a road surface is largely shifted from an actual inclination of the road surface, the following problems can be solved that a shift-up operation is erroneously performed by erroneously estimating a downhill immediately after the shift-down operation is performed on an uphill or a shift-up operation is not performed even on a downhill since the estimated inclination $\delta_P$ indicates an uphill.

As described above, when the shift-down signal is output, the control procedure in this subroutine is completed, and the flow returns to the control routine shown in FIG. 4A.

Figure 4C:
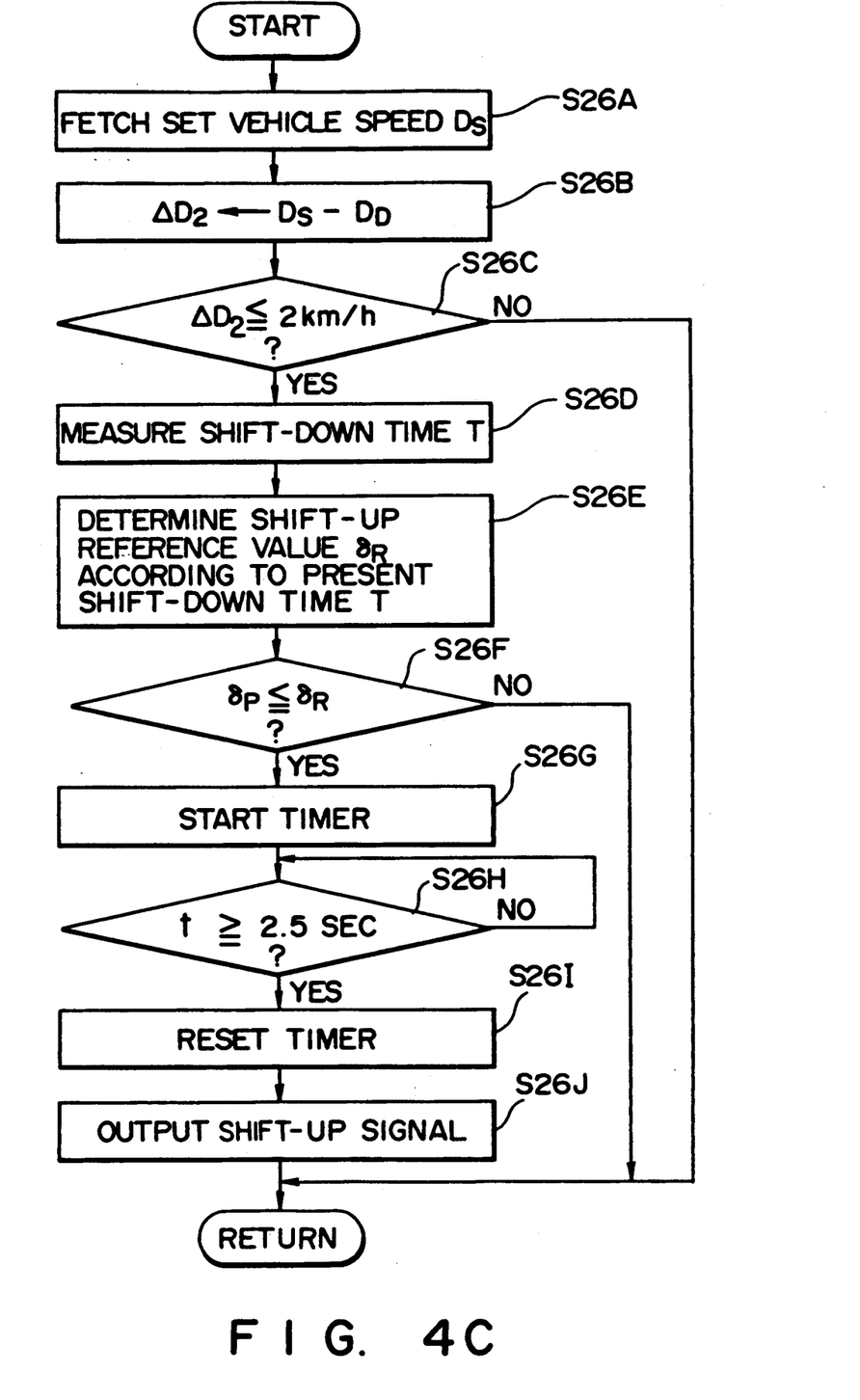
FIG. 4C is a flow chart showing a shift-up subroutine.
Figure 5:
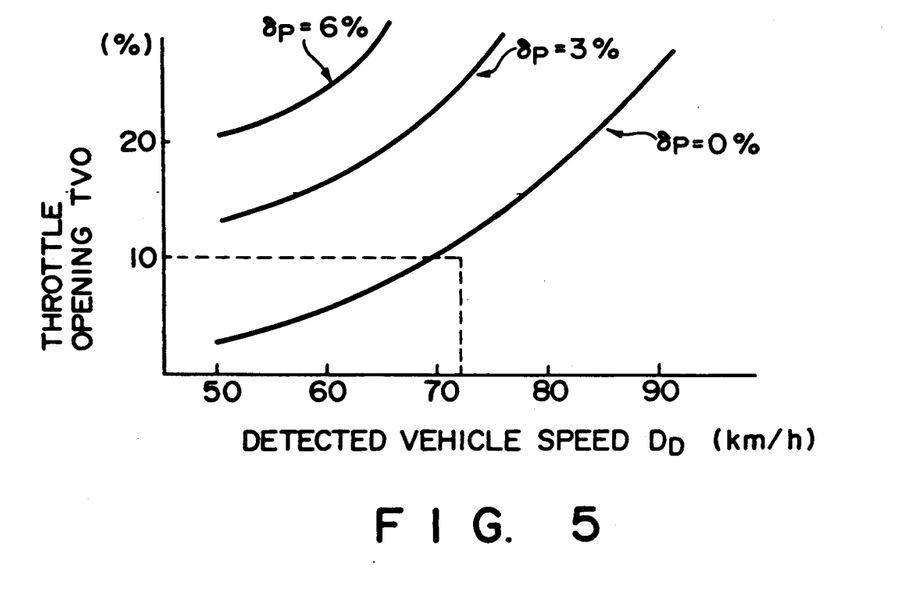
FIG. 5 is a graph showing a correlation for obtaining an estimated inclination of a road surface on the basis of the relationship between a detected vehicle speed and a throttle opening.

The shift-up subroutine in step S26 will be described in detail below with reference to FIG. 4C.

In this shift-up subroutine, the set vehicle speed $D_S$ is fetched in step S26A. In step S26B, a deviation between the set vehicle speed $D_S$ and the detected vehicle speed (present vehicle speed) $D_D$ is calculated in step S26B, and is defined as a second speed deviation $\Delta D_2$. Thereafter, it is checked in step S26C if the second speed deviation $\Delta D_2$ is converged within the range of 2 km/h as a predetermined allowance. If NO in step S26C, i.e., if it is determined that the second speed deviation $\Delta D_2$ is larger than 2 km/h, a travel state continued wherein the present vehicle speed is essentially not recovered (converged) to the set vehicle speed $D_S$, and the shift-up operation should not be performed, this subroutine returns without outputting the shift-up signal.

If YES in step S26C, i.e., if it is determined that the second speed deviation $\Delta D_2$ is within the range of 2 km/h and one of shift-up conditions is satisfied, the lapse time of the shift-down time T, which begins to be measured in step S24E, is measured. In step S26E, the shift-up reference value $\delta_R$ according to the shift-down time T measured in step S26D is determined on the basis of the above-mentioned table. As is apparent from the above table, the shift-up reference value $\delta_R$ as a reference for outputting the shift-up signal is corrected to be a larger value, in other words, toward an uphill direction along with the lapse of the shift-down time T so as to achieve a shift-up operation at an earlier timing.

As a result, even when the estimated inclination $\delta_P$ of a road surface is largely shifted from an actual inclination of the road surface, the following problems can be solved that a shift-up operation is erroneously performed by erroneously estimating a downhill immediately after the shift-down operation is performed on an uphill or a shift-up operation is not performed even on a downhill since the estimated inclination $\delta_P$ indicates an uphill.

Thereafter, it is checked in step S26F if the present estimated inclination $\delta_P$ determined in step S18 is equal to or smaller than the shift-up reference value $\delta_R$ determined in step S26E. If NO in step S26F, that is, if the estimated inclination $\delta_P$ has not yet reached the shift-up reference value $\delta_R$ and does not indicate at least a flat surface and it is estimated that the uphill still continues, the control procedure in this subroutine is completed without outputting the shift-up signal. The flow then returns to the control procedure shown in FIG. 4A.

If YES in step S26F, that is, if the estimated inclination $\delta_P$ is equal to or smaller than the shift-up reference value $\delta_R$ and it can be estimated that the inclination essentially indicates not an uphill but a flat road or downhill, a timer is started in step S26G, and the lapse time t after the condition in step S26F is established is counted. In step S26H, it is checked if the lapse time t exceeds 2.5 sec.

Until YES is obtained in step S26H, i.e., until 2.5 seconds of the lapse time t have passed, the shift-up signal is not output. After 2.5 seconds have passed, the timer is reset in step S26I, and the shift-up signal is output from the shift-up judging section 54 in step S26J. In this manner, as shown in FIG. 6, in the automatic transmission 16, the gear ratio is shifted up to a gear ratio for the overdrive speed regardless of the selected position of the shift lever 36.

In this manner, after the estimated inclination $\delta_P$ coincides with the shift-up reference value $\delta_R$, the shift-up signal is output after the lapse of 2.5 seconds. Therefore, when the road surface is essentially recovered to a sufficiently flat state, the shift-up signal is output. As a result, if the road surface is repetitively an uphill and downhill within a short period of time, stable control can be achieved.

After the shift-up signal is output, the control procedure in this subroutine is ended, and the flow returns to the control routine shown in FIG. 4A.

As described above, according to this embodiment, when the vehicle approaches an uphill and the vehicle speed is decreased, the shift-down operation is performed when a speed deviation becomes equal to or larger than a predetermined value. A shift-up judgement, after the detected vehicle speed $D_D$ is essentially recovered to the set speed $D_S$, is executed when a road surface inclination which is estimated on the basis of the throttle opening TVO and the detected speed $D_D$ coincides with the shift-up reference value $\delta_R$, thereby outputting the shift-up signal. As a result, according to this embodiment, overdrive control corresponding to an actual road surface inclination can be realized, thus improving riding comfort and fuel consumption.

The present invention is not limited to the arrangement of the above-mentioned embodiment, and various changes and modifications may be made within the spirit and scope of the invention.

For example, numerical values used in the description of the above embodiment are merely examples, and the present invention is not limited to these values, as a matter of course.

In the above embodiment, in order to detect the engine load, the throttle opening is used. However, the present invention is not limited to this. For example, an air intake negative pressure may be used.

In the above embodiment, in order to detect that the road surface state is not an uphill, a coincidence between the estimated inclination $\delta_P$ and the shift-up reference value $\delta_R$ is used. However, the present invention is not limited to this. For example, the detection may be made when an estimated inclination coincides with "0".

In the above embodiment, the shift-up reference value $\delta_R$ is adopted as a value which changes along with the lapse of the shift-down time. However, the present invention is not limited to this. For example, the estimated inclination $\delta_P$ may be corrected along with the lapse of the shift-down time.

In the above embodiment, as a condition for outputting the shift-up signal, it is determined whether or not the detected vehicle speed $D_D$ is essentially converged to the set vehicle speed $D_S$, and it is then determined whether or not the estimated inclination $\delta_P$ coincides with the shift-up reference value $\delta_R$. However, the present invention is not limited to this order. For example, the determination steps may be executed in the opposite order.

As many apparently widely different embodiments of the present invention can be made without departing from the spirit and scope thereof, it is to be understood that the invention is not limited to the specific embodiments thereof except as defined in the appended claims and their equivalents.

What is claimed is:

1. A constant speed control apparatus for a motor vehicle, comprising:
    setting means for setting a target vehicle speed;
    first detection means for detecting a vehicle speed of a traveling vehicle;
    shift-down signal output means for, when the detected vehicle speed is decreased from the target vehicle speed to fall outside a predetermined range in a constant speed travel state, outputting a signal to cause an automatic transmission to perform a shift-down operation;
    second detection means for detecting that the detected vehicle speed is substantially recovered to the target vehicle speed after the shift-down signal is output;
    estimation means for estimating a road surface inclination on a basis of an engine load and the detected vehicle speed; and
    shift-up signal output means for, when the detection result by said second detection means and an estimation result of substantially not an uphill by said estimation means are established, outputting a shift-up signal to said automatic transmission.

2. The constant speed control apparatus according to claim 1, wherein said estimation means corrects a reference value as a reference used when the shift-up signal is output, in accordance with the road surface inclination estimated when the shift-down signal is output.

3. The constant speed control apparatus according to claim 1, wherein said estimation means corrects the estimated road surface inclination in accordance with a lapse time from when the shift-down signal is output.

4. The constant speed control apparatus according to claim 2, wherein said estimation means corrects the estimated road surface inclination in accordance with a lapse time from when the shift-down signal is output.

5. The constant speed control apparatus according to claim 1, wherein said estimation means corrects a reference value as a reference used when the shift-up signal is output, in accordance with a lapse time from when the shift-down signal is output.

6. The constant speed control apparatus according to claim 2, wherein said estimation means corrects a reference value as a reference used when the shift-up signal is output, in accordance with a lapse time from when the shift-down signal is output.

7. A constant speed control apparatus for a motor vehicle which includes an engine and an automatic transmission, comprising:
    setting means for setting a target vehicle speed;
    first detection means for detecting a vehicle speed of a traveling vehicle;
    control means for controlling an engine output so that the detected vehicle speed is equal to the target vehicle speed;
    arithmetic means for comparing the target vehicle speed and the detected vehicle speed to calculate a speed deviation therebetween;
    shift-down signal output means for, when the detected vehicle speed is decreased from the target vehicle speed to fall outside a predetermined range in a constant speed travel state under the control of said control means, outputting a signal to cause said automatic transmission to perform a shift-down operation on a basis of a arithmetic result of said arithmetic means;
    second detection means for detecting that the detected vehicle speed is essentially recovered to the target vehicle speed after the shift-down signal is output;
    estimation means for estimating a road surface inclination on the basis of an engine load and the detected vehicle speed; and
    shift-up signal output means for, when the detection result by said second detection means and an estimation result of substantially not an uphill by said estimation means are established, outputting a shift-up signal to said automatic transmission.

8. The constant speed control apparatus according to claim 7, wherein said estimation means includes:
    judging means for judging a degree of the road surface inclination estimated when the shift-down signal is output; and
    correction means for correcting a reference value as a reference used when the shift-up signal is output, in accordance with the degree of the road surface inclination judged by said judging means.

9. The constant speed control apparatus according to claim 8, wherein said correction means corrects the reference value to be larger as the degree of the road surface inclination judged by said judging means is larger.

10. The constant speed control apparatus according to claim 8, wherein said estimation means includes:
    timer means for measuring a lapse time from when the shift-down signal is output; and correction means for correcting the estimated road surface inclination in accordance with the measurement result of said timer means.

11. The constant speed control apparatus according to claim 10, wherein said correction means corrects the estimated inclination to be larger as the time measured by said timer means is longer.

12. The constant speed control apparatus according to claim 8, wherein said estimation means includes:
   timer means for measuring a lapse time from when the shift-down signal is output; and
   correction means for correcting the reference value as the reference used when the shift-up signal is output, in accordance with a measurement result of said timer means.

13. The constant speed control apparatus according to claim 12, wherein said correction means corrects the reference value to be larger as the time measured by said timer means is longer.

14. The constant speed control apparatus according to claim 7, wherein said control means controls the engine output by adjusting an opening of a throttle valve of said engine.

15. The constant speed control apparatus according to claim 7, which further comprises:
   first multiplex communication means, connected to said shift-down signal output means and said shift-up signal output means, for outputting the shift-down and shift-up signals in a multiplexed state; and
   second multiplex communication means, connected to said automatic transmission, for receiving the multiplexed signal from said first multiplex communication means and identifying the shift-down and shift-up signals.

* * * * *